M. H. CURTIS.
COFFEE-POT.
No. 175,339. Patented March 28, 1876.
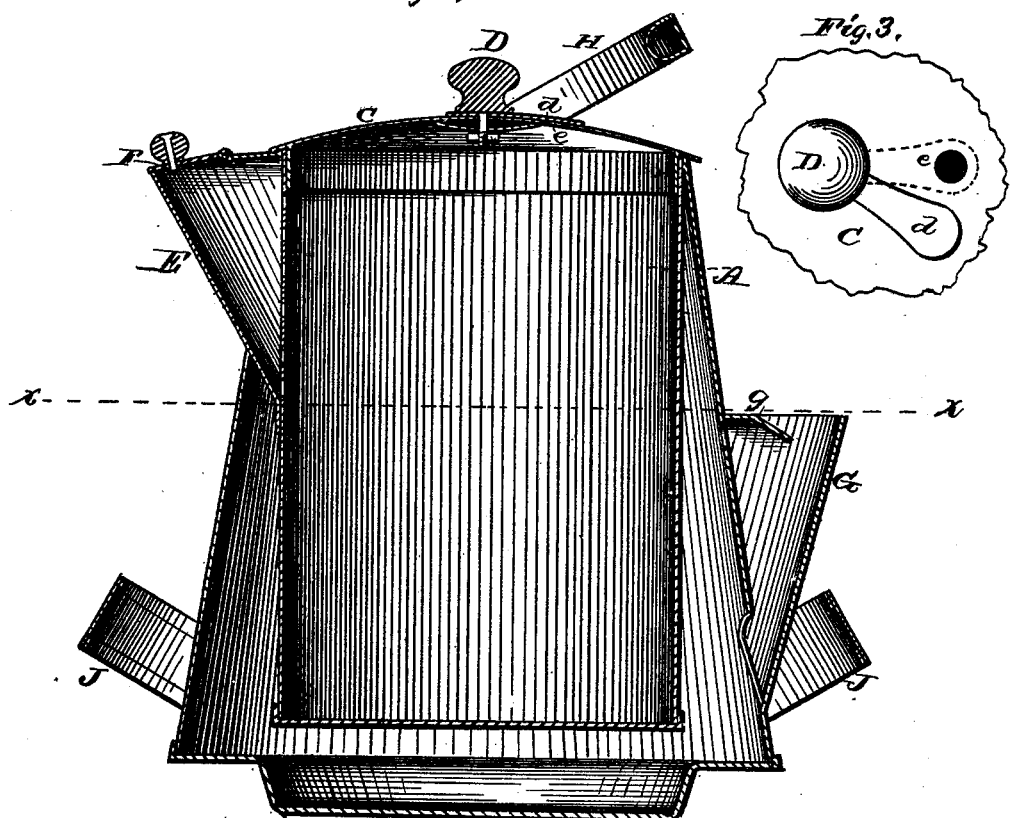
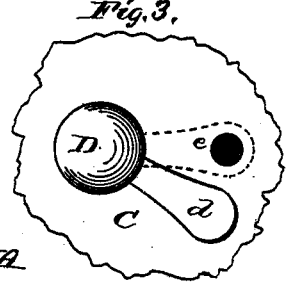
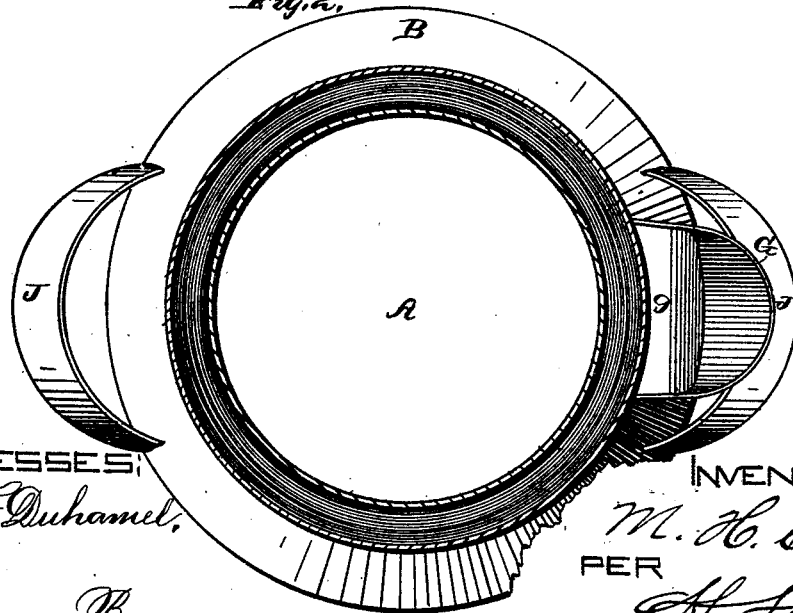
Witnesses:
Jas. F. Duhamel,
Thomas Byrne,
Inventor:
M. H. Curtis,
per H. S. Abbot,
Attorney.

UNITED STATES PATENT OFFICE.

MARILLA H. CURTIS, OF TOLEDO, OHIO.

IMPROVEMENT IN COFFEE-POTS.

Specification forming part of Letters Patent No. 175,339, dated March 28, 1876; application filed January 28, 1876.

*To all whom it may concern:*

Be it known that I, MARILLA H. CURTIS, of Toledo, in the county of Lucas and State of Ohio, have invented certain new and useful Improvements in Coffee-Pots, of which the following is a specification:

This invention consists of a coffee-pot provided with an internal and external chamber, the internal chamber forming the coffee-pot proper, the external chamber being a boiler containing water, and receiving the heat from a fire direct, which heat it transmits through the water which it contains to the prepared coffee in the internal chamber.

The details of the whole apparatus will now be described.

In the drawing forming part of this specification, Figure 1 is a vertical section through the whole vessel, and Fig. 2 a cross-section at the line $x\ x$ of Fig. 1. Fig. 3 is a plan of a device for opening an aperture or vent in the top of the coffee-pot for the escape of vapor when desired.

In the drawing, A is the coffee-pot proper. B is the external shell forming the boiler surrounding the chamber A. C is the top of the coffee-pot, provided with a knob, D, for opening it, to which is attached a strip of metal, $d$, which traverses as the knob rotates, and thus opens or closes a vent, $e$, in the top C. E is the spout covered by a hinged lid, F. G is a spout for filling the boiler B with water. The mouth of this spout is partly closed by a hood, $g$, which overhangs a hole or holes in the shell of the boiler B, and serves to condense the steam escaping through the holes, which act as safety-outlets for the steam. The said hood or deflector thus acts to protect the hand from the escaping steam when the vessel is grasped by the handles or ears J J. Holes are also made in the shell of the chamber A, opening into the spout E, which act as ordinary strainers and outlets for pouring out the coffee. H is a bail at the top of the vessel, and J J are handles or ears on the outside of the boiler B for convenience in handling the vessel.

It can now be well understood that by this arrangement of parts no coffee can possibly be burned, or even thrown into violent ebullition, the latter action being the main cause of thick or muddy coffee. The coffee is really quietly distilled, and its purest flavor extracted and preserved. A smaller quantity of ground coffee will, therefore, produce a greater quantity of good liquid coffee than by the ordinary methods of boiling can be made. No clearing material need be used with this coffee-pot, and none of the aroma of the coffee can escape. Should any necessity arise for permitting any vapor to escape from the coffee-pot, the knob D can be turned sufficiently to withdraw the plate $d$ from the hole $e$.

This device is shown as a useful and convenient adjunct; but such device I do not claim as of my own original invention.

It is evident that the water in the boiler B being once heated, it must first be cooled before the coffee can lose its heat; hence the coffee can be kept for a much longer time hot than if in any unjacketed vessel.

Having thus fully described this improved coffee-pot, as of my invention, I claim—

The inner or coffee chamber A, suspended within the water-jacket B, and provided with the spout E, directly attached thereto and to the wall of the water-jacket, whereby the said inner chamber and jacket are securely braced together, for the purposes hereinbefore set forth.

In testimony that I claim the foregoing as my own I affix my signature in presence of two witnesses.

MARILLA H. CURTIS.

Witnesses:
J. T. NEWTON,
I. P. PUGSLEY.